United States Patent [19]
Wake

[11] 3,833,246
[45] Sept. 3, 1974

[54] COUPLING FOR PLASTIC CONDUIT
[75] Inventor: Harold E. Wake, Lindsay, Calif.
[73] Assignee: Apache Corporation, Minneapolis, Minn.
[22] Filed: Aug. 6, 1973
[21] Appl. No.: 385,858

[52] U.S. Cl................................. 285/247, 285/259
[51] Int. Cl............................................. F16l 33/22
[58] Field of Search ............ 285/247, 259, 354, 386

[56] References Cited
UNITED STATES PATENTS

| | | | |
|---|---|---|---|
| 2,266,211 | 12/1941 | Kaiser | 285/247 |
| 2,805,088 | 9/1957 | Cline et al. | 285/259 |
| 3,381,982 | 5/1968 | Elek | 285/247 X |

Primary Examiner—H. Hampton Hunter
Attorney, Agent, or Firm—Dorsey, Marquart, Windhorst, West & Halladay

[57] ABSTRACT

A coupling for flexible, relatively hard plastic conduit comprising a tubular nipple which is inserted into the conduit and a sleeve which surrounds the conduit, the coupling retaining the conduit in position but permitting rotation of the outer sleeve with respect to the hose for securing the same to a mating coupling member. The nipple member is provided with annular ribs which except for an outer flange abutting the end of the conduit are the only portions of the nipple which are of a greater diameter than the interior diameter of the hose. The outer sleeve has an outer coupling portion designed to couple with a male coupling member, an intermediate section of larger internal diameter than the external diameter of the conduit, and an inner portion having an internal diameter substantially equal to but slightly greater than the external diameter of the conduit. When assembled on the conduit, the intermediate portion of the outer sleeve overlies the annular ribs of the nipple which push portions of the conduit outwardly into the intermediate portion of the outer sleeve. The outer coupling portion of the outer sleeve is preferably a female coupling member designed to be tightly coupled with a male coupling member, the end of which presses against the outer flange of the nipple members to press it into sealing engagement with the outer wall of the intermediate portion of the outer sleeve.

8 Claims, 3 Drawing Figures

PATENTED SEP 3 1974　　3,833,246

COUPLING FOR PLASTIC CONDUIT

BACKGROUND OF THE INVENTION

It is quite common in connection with hose coupling in which the hose is of relatively soft, readily distortable material to employ nipple and sleeve members which clamp the hose between them by severely distorting the material of the hose. Such couplings result in the coupling member being rigidly connected to the hose and being sealed against leakage between the coupling member and the hose by reason of the clamping action exerted on the hose.

While such couplings work very well with relatively soft material such as rubber or corresponding synthetic materials, they do not work as well with relatively hard plastic conduit such as conduit made of polyethylene. Such material, if sharply distorted, will tend to develop weaknesses which eventually lead to fractures. As a result, it has often been necessary to use coupling members which are cemented to the conduit. While this works reasonably well with a joint between two sections, it is not wholly satisfactory for coupling to some fixed coupling member such as provided at the outlet of water supplies. Furthermore, any fitting employing adhesive takes time to apply and requires a waiting period before water pressure can be applied to it.

SUMMARY OF THE INVENTION

The present invention is concerned with a coupling for a relatively hard plastic conduit in which there are two interfitting members which, while they result in some distortion of the conduit, result in so little that the conduit is not placed under severe stress. The sealing action is partially accomplished between the conduit and the members of the coupling unit and is completed when the coupling is connected to a mating coupling member. Furthermore, the coupling has an outer sleeve which can be rotated with respect to the conduit to facilitate coupling with a cooperating coupling member.

The coupling comprises an outer sleeve member that surrounds the conduit and a nipple member which is inserted into the conduit. The normal diameter of the nipple member is approximately equal to the internal diameter of the conduit so that it can be readily inserted into the conduit. The nipple member is further provided with one or more annular ribs, the inner walls of which are inclined with respect to the axis of the nipple at an angle of less than 45° so that the ribs can be forced into the conduit rather easily. The nipple has an outer flange which abuts the end of the conduit. The outer sleeve has an outer coupling portion, which may be threaded, an intermediate portion, and an inner portion. The intermediate portion, when the coupling is assembled on the conduit, overlies the annular ribs and has a diameter somewhat greater than the external diameter of the conduit to permit the ribs to force portions of the conduit outwardly into the intermediate portion of the outer sleeve. The inner portion of the outer sleeve has a diameter substantially equal to the external diameter of the conduit so that the outer sleeve can be rotated with respect to the conduit.

When the coupling unit is assembled, the coupling is prevented from withdrawal from the conduit by reason of the portions of the conduit which have been distorted outwardly into the intermediate portion of the outer sleeve. Since, however, the internal diameter of much of this intermediate portion of the outer sleeve is less than the external diameter of the nipple plus twice the thickness of the conduit, the clamping action exerted between the rib or ribs and the internal wall of the outer sleeve is relatively limited. Thus, it is possible even after the coupling is assembled to rotate the sleeve with respect to the conduit.

The coupling portion of the outer sleeve is preferably a female coupling member joined to the intermediate portion by a shoulder against which bears the flange of the internal nipple. When the female coupling member is coupled to a male member, the end of the male member presses against this flange and presses it into sealing engagement with the shoulder of the outer sleeve. In this way, the coupling is sealed even though the outer sleeve is not secured to the conduit in a liquid-tight manner.

While the internal diameter of the inner portion of the outer sleeve is approximately equal to the outer diameter of the conduit, it is preferable for this internal diameter to be slightly greater than the outer diameter of the conduit. This facilitates assembly of the apparatus and also insures that the outer sleeve can be rotated with respect to the conduit during the coupling operation.

Further features and objects of the invention will be apparent from a consideration of the accompanying specification, claims and drawing.

DESCRIPTION OF THE PREFERRED EMBODIMENT

Figure 1:
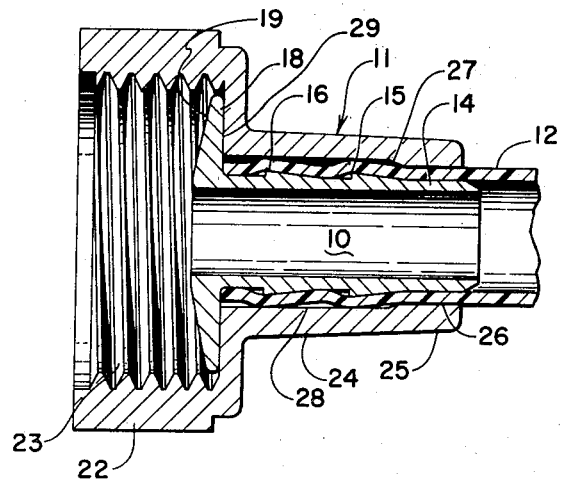
FIG. 1 is a vertical sectional view of the coupling of my improved coupling secured to a conduit of the type with which it is designed to be used.

Referring to FIG. 1, it will be noted that the coupling comprises an inner nipple member 10 and an outer sleeve member 11. While these can be made of any suitable material having sufficient strength, I have found it desirable to form them of a synthetic polyamide such as nylon. The nipple member extends into the end of a conduit 12 and the sleeve member 11 surrounds the outer end of the conduit 12. The nipple member is provided with an inner cylindrical portion 14 having an outer diameter equal to or slightly less than the internal diameter of conduit 12. Projecting outwardly from the nipple member are a pair of ribs 15 and 16. It will be noted that in each case, the outer wall of the rib is substantially vertical while the inner wall slopes with respect to the longitudinal axis of the nipple member. It is desirable that this slope be relatively gentle so that the nipple member can readily be inserted into the rather hard conduit 12. The inner walls should accordingly have an angle with respect to the longitudinal axis of substantially less than 45° and it is desirable that the angle between the inner and outer walls of each rib be less than 90°. The outer end of the nipple member 10 terminates in a flange 18 having a diameter substantially greater than the outer diameter of the conduit with which the nipple member is to be used. The outer wall 19 of flange 18 may be conical, as shown, to reduce the thickness of the flange adjacent the area where it is contacted by the male member.

Referring now to the outer sleeve member 11, this has three portions, an outer coupling portion 22, an intermediate portion 24, and an inner portion 25. The outer coupling portion 22 is designed for coupling with some complementary coupling member. Specifically, I have shown the coupling member as an internally threaded coupling member having internal threads 23 designed to be connected with an exteriorly threaded male member.

The intermediate portion 24 has a slightly conical interior passage 28, the minimum diameter of which substantially exceeds the outside diameter of the conduit 12. The maximum internal diameter of portion 24, however, is greater than the diameter of ribs 15 and 16 plus twice the thickness of the conduit 12 and the minimum diameter is only slightly less. Thus, although the ribs 15 and 16 prevent the conduit from being withdrawn from the coupling when the latter is assembled, the clamping action between the ribs 15 and 16 and the internal conical wall 28 of portion 24 is sufficiently small that there is no abrupt distortion of the wall of the conduit.

The innermost portion 25 of the outer sleeve 11 is joined with the intermediate portion 24 by an inclined shoulder 27 and has a cylindrical passageway therethrough. This cylindrical passageway is preferably equal to but slightly greater than the outside diameter of the conduit 12. In other words, the entire sleeve 11 has no portion having an internal diameter less than the outside diameter of the conduit 12. It can thus be moved freely along the conduit. The intermediate portion 24 is joined with the coupling portion 22 by a shoulder 29. As will be presently explained, the outer portion of flange 18 is pressed into sealing engagement with the shoulder 29 when the coupling is coupled tightly with a male coupling member.

Figure 2:
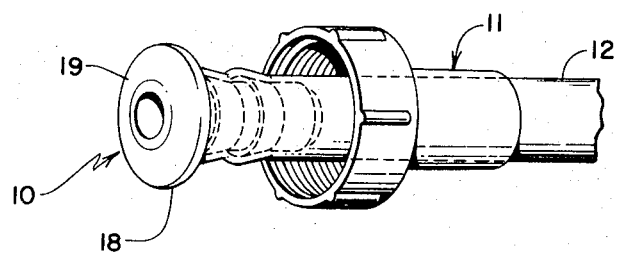
FIG. 2 is a perspective view showing the coupling being applied to a conduit.

The method of assembling the unit is shown in FIG. 2. The outer sleeve member 11 is first slipped over the conduit 12, being moved backwardly a distance from the end at least equal to the length of the nipple 10. The nipple 10 is now inserted into the end of the conduit with the flange 18 abutting the end of the conduit. In inserting the nipple, it is necessary to slightly distort the material of the conduit as the ribs 15 and 16 are forced into the conduit. Due to the gentle slope, however, of the inner walls of the ribs 15 and 16, the material of the conduit is forced outwardly without any sharp joints. Furthermore, it is possible to insert the nipple without exerting a great deal of force on the nipple.

The outer sleeve 11 is now moved to the left (as shown in FIG. 2) until its internal shoulder 29 abuts the inner surface of flange 18. In other words, it is moved to the position shown in FIG. 1. Inasmuch as the internal diameter of the inner portion 26 of this outer sleeve is equal to or slightly greater than the outer diameter of the conduit 12 and since the internal diameter of the conical portion 28 is greater over much of its extent than the sum of the diameter of rib 15 or 16 and twice the thickness of the wall of conduit 12, the outer sleeve 11 can readily be forced into the position shown in FIG. 1 from that shown in FIG. 2. While there will be some clamping action on the conduit between rib 15 and the outer sleeve due to the rib extending inwardly into the inner portion 25 of the sleeve, this clamping action is sufficiently light that the sleeve 11 can be freely rotated so that it can act as the swivel coupling with another member.

Figure 3:
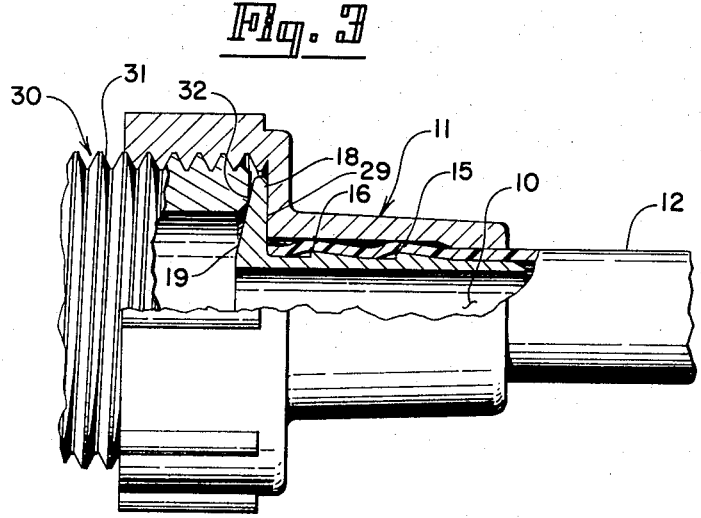
FIG. 3 is a vertical, partially sectional view similar to that of FIG. 1 and with a male coupling member secured to the coupling.

In FIG. 3, I have shown the coupling connected to a mating male member 30 having external threads 31. The end 32 of the male member 30 is shown as engaging an outer portion of the flange 16. Because of the tapered wall 19, this outer portion is thicker than the base portion and is preferably somewhat flexible. The engagement of the end of the male member with this flange 18 results, as the two members are coupled together, in flange 18 being forced firmly against the shoulder 29. Thus, even though the outer sleeve member 11 fits loosely enough over the conduit 12 that no sealing action exists between the internal wall of the outer sleeve 11 and the exterior of conduit 12, the coupling is sealed against any fluid passing from the interior of conduit 31 to the outside by reason of the seal between the flange 18 and the shoulder 29. If desired, a further washer of flexible material may be placed adjacent the face 19 of the flange 18 between the flange 18 and the end 30 of male coupling member 30.

It will thus be seen that I have provided a coupling for hard plastic pipe which is extremely simple and which causes a minimum stress on the conduit. While my invention is not to be limited to any particular dimensions, I have found it desirable in one particular instance to employ the following dimensions: The conduit employed was a flexible polyethylene conduit having a hardness when measured on a duometer of 90 shore. The conduit had an outer diameter of 0.465 inches and an inner diameter of 0.375 inches. The outer diameter of the inner portion 14 of nipple 10 was 0.370 inches. It will be noted that this is 0.005 inches less than the inner diameter of the conduit. The outer diameter of the ribs 15 and 16 was 0.415 inches. The inner diameter of the inner portion 25 of the outer sleeve 11 was 0.475 inches as compared with the outer diameter of the conduit of 0.465 inches. The inner diameter of the conical portion 28 of the outer sleeve 11 varied from 0.500 to 0.515 inches. In this connection, it is to be noted that the conduit had a wall thickness of 0.045. Thus, if one adds together the outer diameter of the ribs 15 and 16 to the two thicknesses of the hose, the total is 0.505 inches which is substantially less than the largest internal diameter of the sloping portion 27 and only slightly greater than the minimum diameter of this portion. Because of this, while the hose is firmly clamped between the ribs 15 and 16 and the sloping portion 28 of the outer sleeve, it is not severely distorted and the friction between the outer sleeve and the conduit is sufficiently low that the outer sleeve can be rotated with respect to the conduit.

The flange 18 in the example discussed had an outer diameter of 0.937 inches while the nipple had a length of 0.650 inches from the righthand side of flange 18 to the right-hand base of rib 15. A distance of 0.555 inches existed between the shoulder 29 and the inner extremity of shoulder portion 27. Thus, as shown in the drawing, a portion of the inner wall of rib 15 extends into the portion 25 of the nipple 10 to clamp the hose between the sloping wall of rib 15 and the inner wall of inner portion 25 of the outer sleeve.

As stated above, however, while the above dimensions have been given to aid one in building a typical device and as illustrative of a typical device, the invention is in no way limited to any particular dimensions. Furthermore, in general, while I have shown a specific embodiment of my invention for purposes of illustration, it is to be understood that my invention is limited in scope solely by the appended claims.

I claim as my invention:

1. A conduit coupling for a conduit of flexible relatively hard plastic, said coupling comprising:
    a tubular nipple having an outer diameter approximately equal to the inner diameter of the conduit to which the coupling is to be secured, said nipple having at least one exterior annular rib having an outer diameter substantially exceeding the inner diameter of such a conduit, the walls of said rib being inclined at an angle of less than 90° with respect to each other and the inner wall being inclined at an angle of less than 45° with respect to the longitudinal axis of the nipple to facilitate the insertion of the nipple into the conduit, said nipple terminating at its outer end in a flange having an outer diameter substantially exceeding the outer diameter of the conduit, and
    an outer sleeve having an outer coupling portion and inner and intermediate portions of different interior diameters, said intermediate portion underlying the rib or ribs of said nipple when the nipple is disposed within said sleeve with the flange thereof abutting the outer wall of said intermediate portion and having an interior diameter greater than the outer diameter of the rib or ribs plus twice the thickness of the wall of the conduit, and said inner portion having an interior diameter approximately equal to the outer diameter of the conduit so that when such a conduit is clamped between said nipple and said sleeve member with the flange of the nipple abutting the outer wall of the intermediate portion, the conduit is held against removal from said sleeve but loosely enough to enable said sleeve to be rotated with respect to said conduit.

2. The conduit coupling of claim 1 in which the outer coupling portion of said outer sleeve is a female coupling member designed to be engaged with a male coupling member and in which the outer portion of the flange of the nipple is designed to be pressed into sealing engagement with the outer wall of said intermediate portion by the end of said male coupling.

3. The conduit coupling of claim 2 in which the outer wall of said intermediate portion of said outer sleeve is a shoulder disposed substantially perpendicularly to the longitudinal axis of said sleeve and extending from the interior of the intermediate portion of the sleeve to the coupling portion of said female coupling member.

4. The conduit coupling of claim 1 in which the outer wall of said annular rib on said nipple member extends substantially perpendicularly with repsect to the longitudinal axis of said nipple member.

5. The conduit coupling of claim 2 in which the coupling portion of the female coupling member is an internally threaded portion.

6. The conduit coupling of claim 1 in which the interior diameter of the inner portion of the outer sleeve is slightly greater than the outer diameter of the conduit.

7. A conduit of flexible relatively hard plastic and a coupling secured thereto, said coupling comprising:
    a tubular nipple inserted into the end of said conduit and having an outer diameter approximately equal to the inner diameter of the conduit, said nipple having at least one exterior annular rib having an outer diameter substantially exceeding the inner diameter of such a conduit, the walls of said rib being inclined at an angle of less than 90° with respect to each other and the inner wall being inclined at an angle of less than 45° with respect to the longitudinal axis of the nipple to facilitate the insertion of the nipple into the conduit, said nipple terminating at its outer end in a flange abutting the end of said conduit and having an outer diameter substantially exceeding the outer diameter of the conduit, and
    an outer sleeve having an outer coupling portion and inner and intermediate portions of different interior diameters, said intermediate portion overlying the rib or ribs of the said nipple with the flange thereof abutting the outer wall of said intermediate portion and having an interior diameter greater than the outer diameter of the rib or ribs plus twice the thickness of the wall of the conduit, and said inner portion having an interior diameter approximately equal to the outer diameter of the conduit so the conduit is clamped between said nipple and said sleeve member sufficiently firmly to prevent removal of the conduit from the coupling but loosely enough to enable said sleeve to be rotated with respect to said conduit.

8. The conduit and coupling of claim 1 in which the outer coupling portion of said outer sleeve is a female coupling member designed to be engaged with a male coupling member and in which the outer portion of the flange of the nipple is designed to be pressed into sealing engagement with the outer wall of said intermediate portion by the end of the male coupling.

* * * * *